Figure 1:
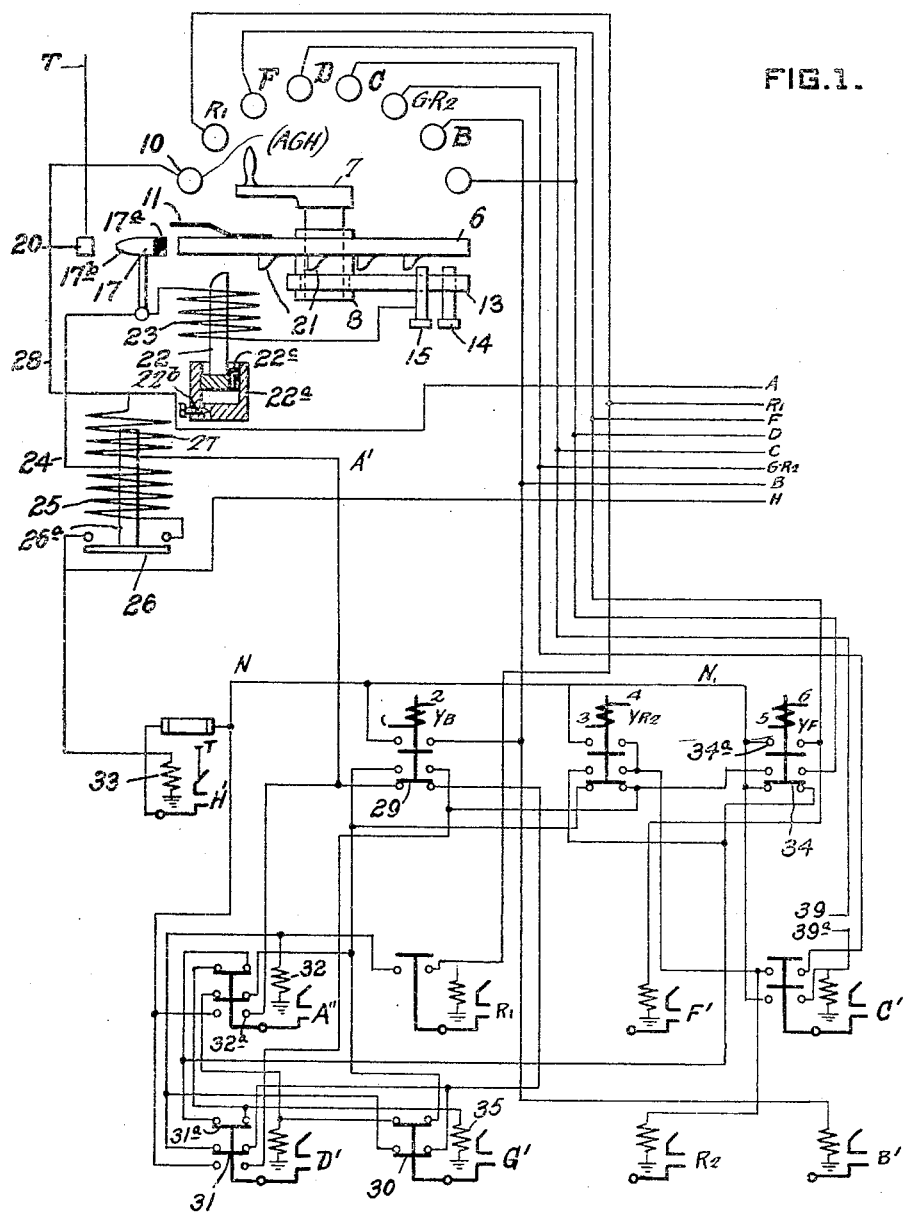

S. R. DODDS.
ELECTRIC MOTOR CONTROL SYSTEM.
APPLICATION FILED JULY 1, 1916.

1,286,960.

Patented Dec. 10, 1918.
2 SHEETS—SHEET 1.

S. R. DODDS.
ELECTRIC MOTOR CONTROL SYSTEM.
APPLICATION FILED JULY 1, 1916.
1,286,960.
Patented Dec. 10, 1918.
2 SHEETS—SHEET 2.
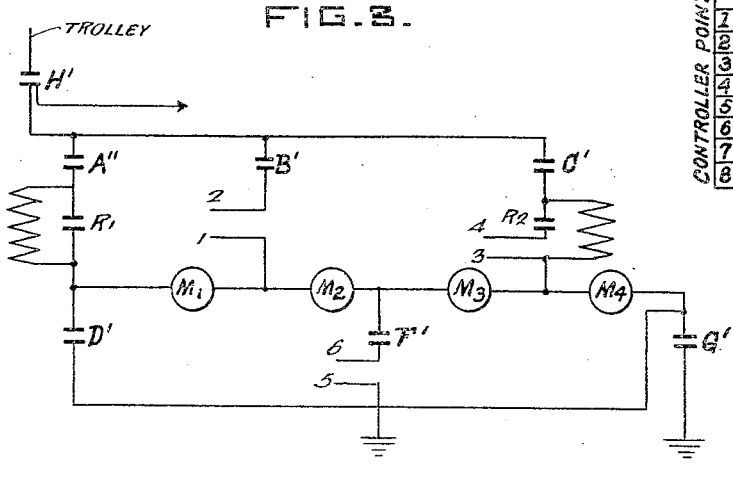
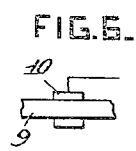
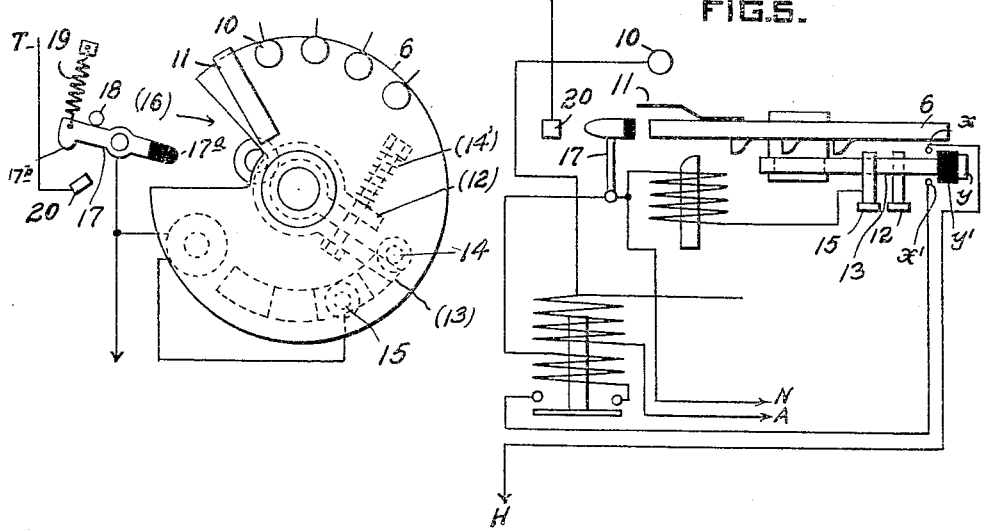
WITNESSES
J. Herbert Bradley.
INVENTOR
Samuel R. Dodds
By F. W. H. Clay
his atty.

UNITED STATES PATENT OFFICE.

SAMUEL R. DODDS, OF WILKINSBURG, PENNSYLVANIA.

ELECTRIC MOTOR-CONTROL SYSTEM.

1,286,960.   Specification of Letters Patent.   Patented Dec. 10, 1918.

Application filed July 1, 1916. Serial No. 107,194.

*To all whom it may concern:*

Be it known that I, SAMUEL R. DODDS, a citizen of the United States, residing at Wilkinsburg, in the State of Pennsylvania, have invented certain new and useful Improvements in Electric Motor-Control Systems, of which the following is a specification.

My invention relates generally to controlling switches for motor systems such as employed on street cars for example, and more particularly to what is known as the unit switch system, in which the attendant manipulates a master controller and this in turn electrically governs a separate system of switches located preferably near the motors. One of the primary objects of my invention is to provide a master controller which primarily operates a subsidiary shunt circuit to close the switch for the main current, but is thereafter relieved of the duty of maintaining such switch closed. Other objects are to provide a master controller of compact and simple construction so as to occupy a small amount of space; to provide independent means supplemental to the master controller for holding the switches closed on the main circuit after they have been closed; to provide an efficient electrically-operated device for preventing the operator from throwing on the current too rapidly; to do away with extended drums or continuous movable contacts; to arrange relays in an efficient manner to permutate the circuits primarily governed by the master controller instead of encumbering the controller itself with complicated mechanism for such permutation; to prevent arcing, to provide various protective devices, and generally to improve the construction and operation of motor control systems. The invention is illustrated in the accompanying drawings, in which,—

Figure 1 is a partial side elevation of a master controller connected in diagram, showing the operation of various switches and relays to be hereinafter described. Fig. 2 is a plan view of the master controller alone, with the handle removed. Fig. 3 is a diagram showing the connections of the main circuit with the motors. Fig. 4 is a table showing the sequence of switches for the different points of the controller; Fig. 5 shows an alternative arrangement of the master controller. Fig. 6 is a detail view showing a contact point mounted in a support.

The master control devices for street car motors heretofore have generally employed complicated drums or barrel switches which handle a current to operate the motor circuits. But in my device I use a master controller which initially sets the switches, and I use a holding-in wire common to all the switches except the main line breaker, which has the function of keeping the switches on the main line closed after they have been closed by the operation of the master controller. By this means I am enabled to greatly simplify the master controller and make it occupy less space. I provide the controller with an electrically-operated lock or protective device known in the art as an automotoneer actuated by an intermittent current taken off the main line current, and in this connection I use a friction arm to open and close the main wire circuit. Incidentally I arrange the controller so that regardless of its position, it prevents any excessive current flowing when power is restored after being interrupted in any way. I avoid the necessity of blowing-out coils or arcing devices in the normal operation by interrupting the power only on the main line contact.

Generally stated, my invention employs a master controller which is charged only with the duty of primarily closing the contactors of the main motor circuit, while there is another supplemental device to thereafter maintain the contactors closed. This supplemental device is a common wire circuit carrying only as much current as is necessary to maintain the contactors closed.

Referring first to Fig. 1, it will be observed that the master controller consists essentially of a rotatably mounted plate 6 manipulated by handle 7 fixed in the hub 8 of the disk. Immediately above the disk and on any convenient form of support 9 I mount a series of contact points such as 10 connected as shown by the diagram. These are arranged to be brought successively in contact with a spring finger 11 as the plate is revolved. On the hub 8 I mount a friction arm 12, 13, of which the two jaws are held resiliently together by a spring 14', while the arm 13 is in position to engage alternately the post 14 or the post 15 as the plate 6 is moved in one direction or the other. The plate has a cut out notch (16) as shown in Fig. 2, and mounted so as to have one end extending into this notch I provide a pivoted switch bar 17 having an insulated end 17ª to engage the plate 6, being normally held in retracted position against pin 18 (Fig. 2), by the retractile spring 19. In the path of the outer end 17ᵇ of this arm I place a fixed contact 20 connected with the trolley T.

On the underside of the plate 6 is provided a series of lugs or notches 21 and mounted in position to engage these notches is the core 22 of a solenoid 23 whose ends are connected respectively to the stationary pin 15 and to the sleeve of the lever 17. From this lever 17 the lead 24 goes through a solenoid coil 25, contact 26, coil 33, and to ground. The second solenoid coil 27 is connected respectively to the first contact point of the controller marked 10, (A, G, H,) and its outer end goes to the wire marked A in Fig. 1.

It will be understood from the illustrative diagram of Fig. 3, showing the motor connections, that it is the object to connect the four motors in various orders, and it will be understood that the contactors shown in this figure and lettered A″, B′, C′, etc., are the same as the contactors so lettered in Fig. 1.

Following the operation in Fig. 1, it will be seen that when the controller plate 6 is turned clockwise it will strike the lever end 17ª and swing the other end 17ᵇ in contact with the point 20, and bring the spring contact 11 into engagement with the first contact point 10 located above, while arm 13 also makes contact with pin 15. Immediately upon making the connection with 20, the current will flow through solenoid coil 23, to pin 15, through arm 13, through plate 6, spring 11, point 10 and the lead 28. The immediate effect is to lift the core 22 to stand in the path of the first tooth 21 on plate 6, so that the controller can go no farther until coil 23 is deënergized.

Following the wiring from coil 27, it will be seen that the current passes through relay switch 29, through interlock switches 30 and 31 and to ground through solenoid coil 32, which operates to close the contactor A″. Since coil 27 being energized has closed switch 26, the current can flow through coil 25 and through solenoid coil 33 to ground, operating to close contactor H′, found on the diagram of Fig. 3, and which, as seen in Fig. 1, will energize the common wire marked N which is connected to the switch H′. Since the closing of contactor A″ has closed points 32ª the current from N will flow through the relay Yᴮ over the same circuit used to close the contactor A″. Contactor A″ will thus be kept closed until the relay Yᴮ opens or the wire N is deënergized. The current also flows through relay switch 34 at the interlock Yᶠ and the interlock switch 31ª on contactor D′, thus reaching the solenoid coil 35 and closing contactor G′. The contactors H′, A″, and G′, on diagram Fig. 3 being thus closed establish a power circuit through the motors marked $M_1$, $M_2$, $M_3$, $M_4$, all in series.

Again referring to Fig. 1, it will be seen that when the contactor H′ was closed and energized the common wire N, the contactors A″, and G′ were thereafter held closed by the shunt current in the wire N, and there is no longer any necessity for the current through the master controller except to hold in the contact H′; also that the coil 23 will now be deënergized because the current from the point 20 which was flowing through coil 23 now has a direct path from the bottom of the main line contactor H′ through the common wire N to relay Yᴮ; wherefore the core 22 will drop by its weight, its speed being regulated either by its weight or by a dash-pot 22ª attached to it, (varying the escapement by screw 22ᵇ), and leave the controller plate 6 free to move farther. When the plate 6 is turned to the off position or counter-clockwise, all the contactors which have been closed will remain closed until the main line contactor H′ opens, which will occur when the power to coil 33 is interrupted, by the plate 6 relieving lever 17 from point 20.

In some cases it may be advisable to have a greater lapse of time between the opening of contactor H′ and the other contactors, and in this case the arrangement shown in Fig. 5 is used. By this arrangement the contactor H′ will open as soon as the controller plate 6 begins to move counter-clockwise, since the plate Y on insulating block Y′ on the bar 13 forms a part of the circuit to H′, through points X, X′ as shown; but the wire N which holds in the other contactors will not be deënergized until the controller plate 6 reaches the off position where it releases the arm 17ᵇ from the contact point 20.

In both forms of the controller it will be observed that the solenoid 27 can be energized only when the controller spring finger 11 is on the first point 10, and the arm 13 in contact with post 15; wherefore, with the controller in any other position, if the power be interrupted the controller must be moved to the off position and then again moved forward to the first point 10 before the power circuit can be closed to the motors through the main line switch H′.

In order to change the connection of the motors putting them in parallel or parallel series, or however desired, the sequence of switches on the diagram of Fig. 1 is carried out as shown by the table of Fig. 4, it being understood that the relays Yᴮ, Yᴿ² and Yᶠ are operated by the power current to the motors and open and close the circuits to the contactor coils as desired, and that the wiring points numbered 1, 2; 3, 4; and 5, 6 in Fig. 1 are the same points so marked in Fig. 3. The diagram (Fig. 3) shows the motors in circuit, and any well known arrangement for manipulating the motors may be used, and it is thought unnecessary to trace out all the several circuits. When the contact spring arm 11 is on the third point marked F, it will be seen that the wire F passes to the closing coil of contactor F'. Referring to Fig. 3, it will appear that the main current through contactor F' passes through points 5, 6, thereby closing relay Y$^F$ (Fig. 1). This closes the points 34$^a$, thus establishing a circuit between common wire N and the closing coil of contactor F'. It will be noted that, as shown in the table of Fig. 4, when the contactor F' closes, the contactor G' is opened; this is brought about by the common mounting of the switches on points 34 and 34$^a$ (Fig. 1). This operation of closing contactor F' and opening contactor G', results in cutting out motors $M_3$ and $M_4$, leaving $M_1$ and $M_2$ still in series, preparatory to pass to the series-parallel running position. The other changes may readily be traced out by aid of the table Fig. 4. It will be understood that the common wire N may be connected with the main line switch H', or may be connected with the master controller through the points X, X' in Fig. 5 and the contact piece Y on the bar 13. It will be understood that the particular arrangement of the switches and motors in Fig. 3 is not an essential part of my invention. In Fig. 1 the relays are used to change the order of circuits of the common wire connections to the controller, and the controller is thus enabled to be simple and compact and avoid arcing or the permutation of circuits by the controller itself. The various advantages of the arrangement will readily occur to those familiar with the art.

Having thus described my invention and illustrated its use, what I claim is the following:

1. A motor control system comprising a master controller, means operated thereby to close main contactors in a motor circuit, and a separately energized circuit adapted to hold said contactors closed thereafter and independent of the master controller, and to release said contactors when said master controller is in off position.

2. A motor control system comprising a motor circuit with a series of main line contactors therein, means to electrically operate the contactors, a master controller governing said closing means, and a supplemental circuit and devices adapted to hold the contactors closed after the operation of the master controller and independently thereof.

3. A motor control system comprising a master controller, means operated thereby to close main contactors in a motor circuit, a shunt circuit adapted to hold said contactors closed thereafter and independent of the master controller, and to release said contactors when said master controller is in off position.

4. A controller for motor systems comprising a series of stationary contacts, a movable contact adapted to close a shunt circuit, an electric means operated by current in said shunt circuit to prevent the movable contacts being moved beyond a predetermined rate.

5. In a motor control system comprising a motor circuit with a series of main line contactors therein, a controller comprising a series of stationary contacts, a movable contact adapted to close a shunt circuit, an electrically operated lock operated by current in said shunt circuit to prevent the movable contact being moved beyond a predetermined rate, and said shunt current also being adapted to close said main line contactors.

6. The combination with a series of motors and appropriate circuits for energizing the same including contactors for permutating the order of connection, a master controller with appropriate circuits adapted to close said contactors in order, and a supplemental common wire circuit independent of the controller and adapted to hold said contactors closed after being closed until the master controller is returned to off position.

7. In a motor control system, a master controller consisting of a revoluble plate having a contact thereon, a series of stationary contacts arranged in one plane to cooperate with said movable contact, a friction arm attached to the plate and adapted to move with and also independently of the plate, a circuit governed by said movable arm and including an electrically-operated stop device to prevent moving the controller beyond a predetermined rate.

8. In a motor control system comprising a motor circuit with a series of main line contactors therein, a controller comprising a series of stationary contacts, a movable contact adapted to close a shunt circuit, an electrically operated lock operated by current in said shunt circuit to prevent the movable contact being moved beyond a predetermined rate, said shunt current also being adapted to close said main line contactors, and a second shunt current passing through a common wire and adapted to release said electric lock.

In testimony whereof I have hereunder signed my name.

SAMUEL R. DODDS.

Copies of this patent may be obtained for five cents each, by addressing the "Commissioner of Patents, Washington, D. C."